United States Patent
Piehler (10) Patent No.: US 10,031,403 B2
(45) Date of Patent: Jul. 24, 2018

(54) DEVICE FOR PROJECTING AN IMAGE INTO A DISPLAY AREA, HAVING A SCREEN FOR DISPLAYING AN INTERMEDIATE IMAGE

(71) Applicant: Sypro Optics GmbH, Jena (DE)

(72) Inventor: Eberhard Piehler, Lehesten OT Nerkewitz (DE)

(73) Assignee: Jabil Optics Germany GmbH, Jena (DE)

( * ) Notice: Subject to any disclaimer, the term of this patent is extended or adjusted under 35 U.S.C. 154(b) by 497 days.

(21) Appl. No.: 14/193,703

(22) Filed: Feb. 28, 2014

(65) Prior Publication Data

US 2014/0247433 A1 Sep. 4, 2014

(30) Foreign Application Priority Data

Mar. 4, 2013 (DE) .................. 10 2013 203 616

(51) Int. Cl.
*G03B 21/14* (2006.01)
*G02B 27/18* (2006.01)
*G03B 21/28* (2006.01)
*G02B 27/01* (2006.01)

(52) U.S. Cl.
CPC ............. *G03B 21/14* (2013.01); *G02B 27/18* (2013.01); *G03B 21/28* (2013.01); *G02B 27/01* (2013.01)

(58) Field of Classification Search
CPC ..... G02B 27/18; G02B 27/01–27/0189; G03B 21/14; G03B 21/28; G03B 21/2066

USPC ......................... 353/12, 13, 94, 99
See application file for complete search history.

(56) References Cited

U.S. PATENT DOCUMENTS

| 5,406,415 A | 4/1995 | Kelly |
| 5,477,394 A | 12/1995 | Shibazaki |
| 5,486,840 A * | 1/1996 | Borrego ............. G02B 27/0101 345/7 |
| 6,359,737 B1 * | 3/2002 | Stringfellow ...... G02B 27/0101 250/214 VT |
| 6,626,542 B2 | 9/2003 | Baba et al. |
| 6,873,470 B2 | 3/2005 | Piehler |
| 6,950,240 B2 | 9/2005 | Matsuo |
| 7,131,728 B2 * | 11/2006 | Nambudiri ............. G02B 27/01 348/44 |
| 7,298,557 B2 * | 11/2007 | Dobschal ........... G02B 27/0101 345/7 |

(Continued)

FOREIGN PATENT DOCUMENTS

| DE | 40 35 260 | 5/1992 |
| DE | 102 12 405 | 10/2002 |

(Continued)

Primary Examiner — Christina Riddle
Assistant Examiner — Christopher Lamb, II
(74) Attorney, Agent, or Firm — Volpe and Koenig, P.C.

(57) ABSTRACT

Device (1) for projecting an image into a display area (2), with an imager (31) generating the picture, a first projection device (30) for generating a real intermediate image (R), a screen (5) onto which the first projection device (32) projects the intermediate image (R) and to a second projection device (9) projecting the intermediate image (R) into the display area (2). In order to project the image with the least possible loss of brightness, the invention provides that main beam directions (H, H', H") of the screen (5) point into an entrance pupil (20) of the second projection device (9).

11 Claims, 4 Drawing Sheets

(56) References Cited

U.S. PATENT DOCUMENTS

| | | | | |
|---|---|---|---|---|
| 2004/0070738 | A1* | 4/2004 | Sekiguchi | G03B 21/208 353/102 |
| 2005/0259223 | A1* | 11/2005 | Hopman | G03B 21/28 353/13 |
| 2006/0209270 | A1* | 9/2006 | Suzuki | G03B 21/2013 353/98 |
| 2007/0229394 | A1* | 10/2007 | Ishikawa | G02B 27/0101 345/7 |
| 2008/0278822 | A1* | 11/2008 | Choi | G02B 27/0101 359/631 |
| 2009/0160736 | A1* | 6/2009 | Shikita | G02B 27/0101 345/7 |
| 2011/0157707 | A1* | 6/2011 | Tilleman | G03B 21/28 359/630 |
| 2011/0175798 | A1* | 7/2011 | Sato | B60K 35/00 345/7 |
| 2012/0099032 | A1* | 4/2012 | Ishikawa | G02B 27/0101 349/11 |
| 2013/0021224 | A1* | 1/2013 | Fujikawa | G02B 27/0101 345/7 |
| 2013/0063754 | A1* | 3/2013 | Saisho | G02B 26/0858 358/1.13 |
| 2015/0168795 | A1* | 6/2015 | Irzyk | H04N 9/3161 353/31 |
| 2015/0219894 | A1* | 8/2015 | Yanning | G02B 5/20 359/630 |

FOREIGN PATENT DOCUMENTS

| | | |
|---|---|---|
| DE | 10253729 A1 | 6/2004 |
| DE | 1020100 34 217 | 2/2009 |
| DE | 60038028 T2 | 2/2009 |

* cited by examiner

DEVICE FOR PROJECTING AN IMAGE INTO A DISPLAY AREA, HAVING A SCREEN FOR DISPLAYING AN INTERMEDIATE IMAGE

CROSS-REFERENCE TO RELATED PATENT APPLICATIONS

This application claims the benefit of Germany Application 10 2013 203 616.7, filed Mar. 4, 2013 including the specification, drawings, claims and abstract, is incorporated herein by reference in its entirety.

BACKGROUND

The disclosure relates to a device for projecting an image in a display area having an imager forming the image, a first projection device for generating a real intermediate image of the image, a screen onto which the first projection device projects the intermediate image, and a second projection device that projects the intermediate image into the display area.

STATE OF THE ART

Devices for projecting an image of the aforementioned type are generally known. For example, such a device is part of a so-called head-up which displays to an occupant of a motor vehicle information in the field of view of the occupant. The information is projected into the display area of the device, for example as a virtual image into the field of view of the viewer.

The display area is frequently formed by a partially transparent element or an element partially reflecting the light, for example a window pane, in particular a windshield of the motor vehicle. Since the installation space available for the device is limited, especially in motor vehicles, but also in other applications, the components of the device cannot be arbitrarily large. Particularly, the employed imager, such as a DMD (Digital Micro-mirror Device with arrayed micro-mirror actuators, wherein the micro-mirrors move for rendering the image) or an LCoS (Liquid Crystal on Silicon, liquid crystals on a silicon substrate) are so small that the etendue of the imager is insufficient to fill the etendue of a projection device that projects the image directly from the imager to the display area. Etendue designates the possible light guidance factor and specifies the maximum transmitted radiation, with the etendue depending, among others, on the solid angle under which the light is emitted from the imager.

In order to better fill in the etendue of the second projection device, the first projection device generates the real intermediate image on the screen. The screen is for example a ground glass screen, which radiates the real image with a larger solid angle than the emission angle of the imager. The solid angle of the beam can also be increased with a screen having micro-lens arrays or in form of microlens arrays, diffractive structures or other means.

Due to the employed screens, light of the real image emitted from the screen partly passing by an entrance pupil of the second projection device, so that the light does not reach the display area to display the image. Since only part of the light emitted from the imager reaches the display area, the image in the display area is either dark or a stronger light source must be used. Another negative effect is an uneven illumination of an entrance pupil of the second projection device which causes variations in brightness for the viewer, for example during movement of the eye in the eyebox.

SUMMARY

It is therefore the object of the invention to provide a device for projecting an image into a display area, wherein the image can be displayed more efficiently, and in particular brighter.

This object is solved for the above-mentioned device in that main beam directions of the screen, in which substantially all portions of the intermediate image are radiated with the maximum intensity, are directed toward the entrance pupil of the second projection device.

The course of the beam path reaching the screen frequently widens at least between the first projection device and the screen, so that individual rays of the beam path are incident on the screen from different directions. The main beam directions of the screen depend on the angle of incidence of the radiation in relation to the screen, wherein the angle of incidence of the light rays directed towards the screen normally corresponds to the exit angles between the main beam directions and the screen. For example, the main beam direction of a central portion of the screen is directed into the entrance pupil of the second projection device. However, main beam directions of the edge regions of the screen may pass by the entrance pupil, so that the light emitted by the edge region with maximum intensity does not pass through the entrance pupil, but only light that is emitted from the edge region at a lower intensity. When the beam direction deviates from the main beam direction, the light is radiated from the screen with an intensity less than the maximum possible intensity to produce the image in the display area.

Because the main beam directions of the screen are oriented toward the entrance pupil of the second projection device, it is ensured that the intermediate image is emitted into the entrance pupil with maximum intensity. The image is thus transmitted from the screen to the second projection device as an intermediate image with maximum efficiency, thus increasing the total projection efficiency of the device. The screen according to the invention thus radiates a light beam defined by the main beam directions which is wider than the light beam incident on the screen and impinges on the entrance pupil of the second projection device over the entire field of the screen as close to the center as possible.

The solution of the invention can be further improved by various embodiments that are advantageous both individually and in combination. These embodiments and their advantages will be described in detail below.

For example, the screen may be curved so that the angle of incidence and therefore also the exit angle of the incident light and the light emitted from the screen are designed such that the main beam directions of the screen are directed, in particular over the entire screen, into the entrance pupil of the second projection device.

Alternatively, the screen may be divided into segments that have a different orientation in relation to a plane such that the main beam directions of each of the segments are directed into the entrance pupil. Furthermore, the screen may have a lens and, for example, an arrangement of lenses and, for example, an arrangement of very small lenses, so-called micro-lenses, that essentially direct the light incident on the screen completely into the entrance pupil of the second projection device. Such screen may be formed, for example, as a field lens or a Fresnel lens.

According to a particularly simple embodiment, the screen may have a spherical shape, i.e. may extend at least in part or completely along a spherical surface. In particular, the screen may be curved toward the first projection device so that the beam emerging from the screen becomes wider than the beam path incident on the screen.

When the screen is transmissive and constructed for example as a Fresnel lens, it may be difficult to block light from light sources, in particular sunlight, not originating from the device designed to illuminate the screen, wherein reflections of this light interfere with the rendering of the image. To prevent reflections caused by a lenticular screen, the screen is preferably formed as a reflective screen, for example a ground glass screen.

Furthermore, reflections on the screen can be prevented by tilting the screen with respect to an optical axis of the device. In particular, the optical axis of the screen may be tilted relative an optical axis of the first and/or the second projecting device.

In order to project a sharp intermediate image, the intermediate image is preferably formed commensurate with the geometry of the screen and, for example, curved and/or tilted.

Moreover, the reflective screen can be used to fold the optical path of the device, thereby making the device more compact with a small focal distance, for example less than 300 mm, is less than 200 mm, for example less than 120 mm, or even less than 80 mm.

To make the device particularly compact and to further fold, for example, an optical projection path of the device, the screen may be formed as an ellipsoid segment having two focal points, wherein one of the focal points may be arranged in the exit pupil of the first projecting device and another of the focal points may be arranged in the pupil the second projection device.

In order to prevent the curvature of the screen from causing a blurred image of the image generated by the imager, the first projection device may be configured to generate the intermediate image as a curved image and the second projection device may be configured to image a corresponding curved object.

Preferably, the display area is a display area of a head-up display and arranged, for example, along a windshield of a motor vehicle or of another combiner, for example, a partially reflective window arranged in the field of view. The image in the display area may be formed as a real image or a virtual image. Virtual intermediate images are preferred in a motor vehicle because they can be displayed at a distance from the viewer that practically does not require accommodation times when the viewer changes the field of view from outdoor scenes to the display contents of the projection.

The invention will now be described by way of embodiments with reference to the drawings. The different features of the embodiments can be combined independently with one another, as has already been stated for the individual advantageous embodiments.

DETAILED DESCRIPTION OF THE PREFERRED EMBODIMENTS

First, the structure and function of a device according to the invention will be described with reference to the exemplary embodiment of FIG. 1.

The device 1 for projecting an image in a display area 2 is shown with a projection beam path 3 illustrated by arrows. Along the projection beam path 3, the image of an imager is projected into the display area 2. The projection beam path 3 extends from a projector 4 to a screen 5, from the screen 5 to a first mirror 6, and from there to a second mirror 7, and from the second mirror 7 to the display area 2. The image projected into the display area 2 can be seen by an observer 8, wherein the image in the display area 2 can be a real or a virtual image.

The projector 4 may include the image-forming imager and a first projection device projecting the image from the imager onto the screen 5. The screen 5 is provided to enlarge the etendue of the projector 4, wherein the screen 5 can be for example a reflective or a transmissive screen and emit the image received from the projector 4 into a larger solid angle than done by the projector 4. The projector 4 projects the image as a real intermediate image R onto the screen 5, so that the image can be projected by the two mirrors 6, 7 forming a second projection device 9 into the display area as a real intermediate image R. The mirrors 6, 7 may be flat mirrors or may have a refractive power suitable to reflect the real intermediate image R into the display area 2 magnified or demagnified. Magnification of the image in the display area is preferred. Additionally or alternatively, the second projection device 9 may also include lenses, prisms or other optical elements for projecting the intermediate image R into the display area 2.

In order to project the real image R with the highest possible intensity into the display area 2, the screen 5 is constructed to radiate substantially all portions of the intermediate image R with maximum intensity in the direction of the second projection device 9, and in particular in the direction of an entrance pupil of the second projection device 9. In the exemplary embodiment of FIG. 1, the screen 5 is for this purpose curved so that both central and peripheral regions of the intermediate image R are irradiated with maximum intensity in the direction of the second projection device 9.

Figure 1:
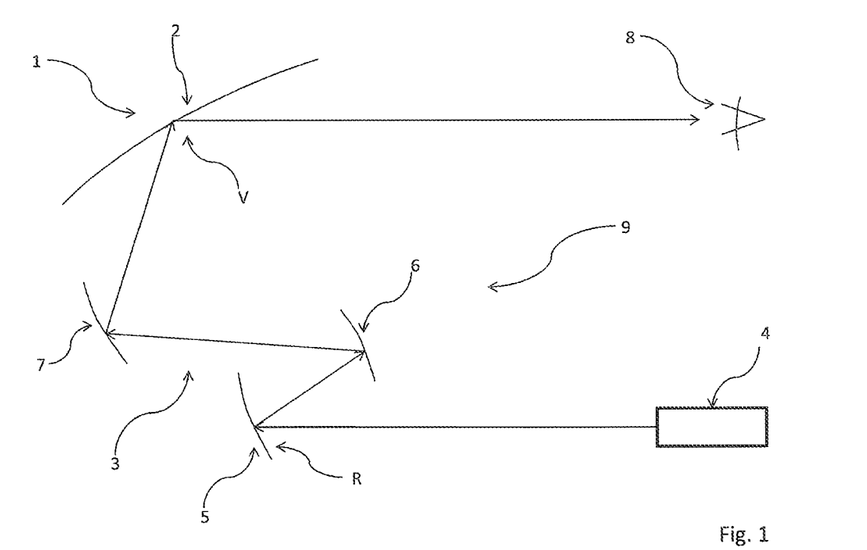
FIG. 1 a schematic diagram of a first exemplary embodiment of the invention.
Figure 2:
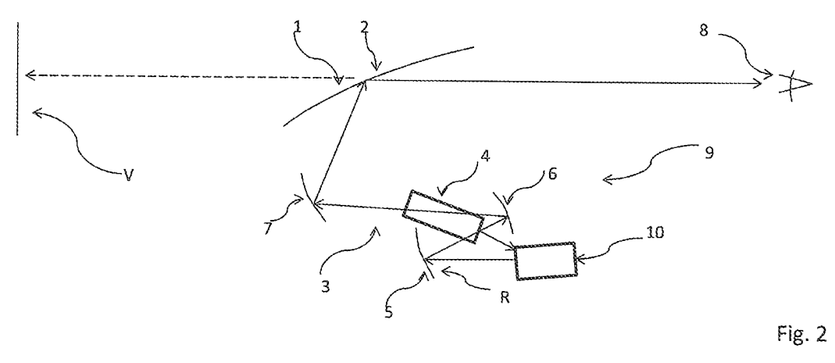
FIG. 2 a schematic diagram of another exemplary embodiment of the invention, wherein a projection beam path is further folded.

FIG. 2 shows another exemplary embodiment of the invention, wherein identical reference numerals are used for elements corresponding in their function and/or structure to the elements of the exemplary embodiment of FIG. 1. For sake of brevity, only the differences from the exemplary embodiment of FIG. 1 are addressed.

Compared to the device 1 illustrated in the exemplary embodiment of FIG. 1, the device 1 shown in FIG. 2 has in addition a deflection element 10 that folds the projection beam path 3 between the projector 4 and the screen 5 in order to make the device 1 more compact. The deflecting element 10 is, for example, a mirror or a prism.

Figure 3:
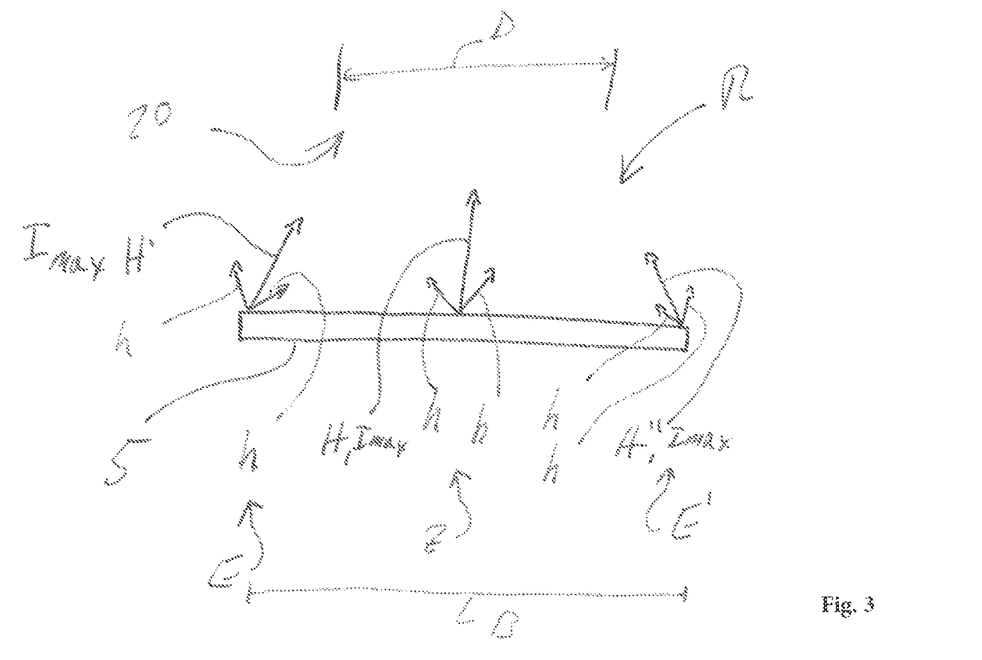
FIG. 3 a schematic diagram of an embodiment of a screen according to the invention.

FIG. 3 shows schematically another exemplary embodiment of a screen 5 according to the invention in a side view.

Identical reference numerals are used for elements corresponding in their function and/or structure to the elements of the exemplary embodiments of FIG. 1 or FIG. 2. For sake of brevity, only the differences from the exemplary embodiments of FIGS. 1 and 2 are addressed.

The screen 5 in FIG. 3 is shown flat. When the screen 5 is installed in the device 1 and the image of the imager is displayed on the screen 5 for example by the projector 4 as the real intermediate image R, the main beam directions H, H', H" of the screen 5 are directed into a schematically illustrated entrance pupil 20 of the second projection device 9. The main beam directions H, H', H" are hereby directions, in which the screen 5 radiates the real intermediate image R with maximum intensity Imax. In directions h other than the main beam directions H, H', H", the intermediate image R can be radiated with lower intensity. The maximum intensity Imax of the intermediate image R radiated from the screen 5 is indicated by the length of the arrows representing the main beam directions H, H', H" compared to the directions h deviating from the main beam directions H, H', H".

In particular, the main beam directions H, H' can be oriented differently in the edge regions E, E' of the screen 5 or of the intermediate image R than in a central region Z of the screen 5 or the intermediate image R. The screen 5 is preferably designed such that all main beam directions H, H', H" are directed into the entrance pupil 20. The orientation of the main beam directions H, H', H" depends on the width B of the screen 5 or of the intermediate image R, and a diameter D of the entrance pupil 20. Thus, in particular the main beam directions H', H" of the edge regions E, E' may at least component-wise converge toward each other, as shown in the exemplary embodiment of FIG. 3. Alternatively, at least the main radiations H', H" may be oriented parallel to each other or facing away from each other.

In the exemplary embodiment of FIG. 3, the diameter D of the entrance pupil 20 is smaller than the width B of the screen 5 or of the intermediate image R. Consequently, the main beam directions H', H" converge toward each other at least component-wise. If the main beam directions H, H', H" were all parallel to each other and, in particular, aligned perpendicular to the screen 5, then at least the main beam directions H', H" would pass by the entrance pupil 20, so that the intermediate image R would at least in the edge areas E, E' not be delivered into the entrance pupil 20 with maximum intensity Imax, and consequently also not be projected with the maximum possible intensity Imax into the display area 2.

Figure 4:
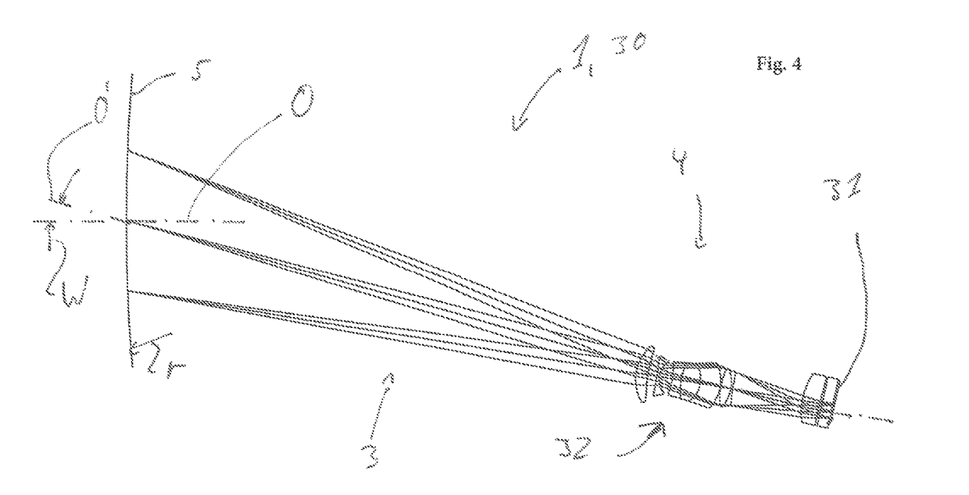
FIGS. 4 and FIG. 5 a partial schematic diagram of another exemplary embodiment of the inventive device in a side view and in a plan view, wherein the image sensor is projected on a curved intermediate image, and FIG. 6 a schematic view of the exemplary embodiment shown in FIG. 4 and FIG. 5, however here the second projection device of the device according to the invention.
Figure 5:
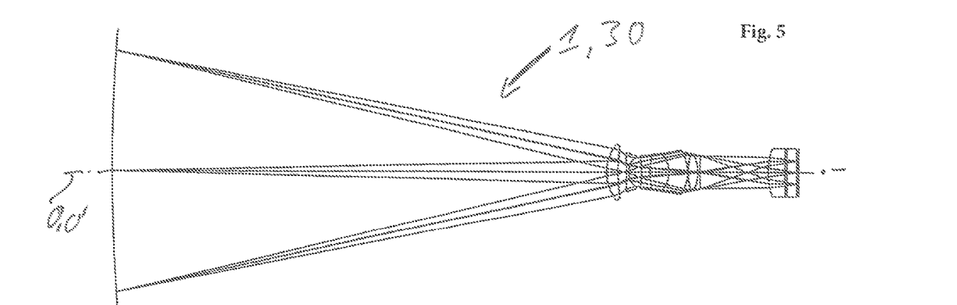
Figure 6:
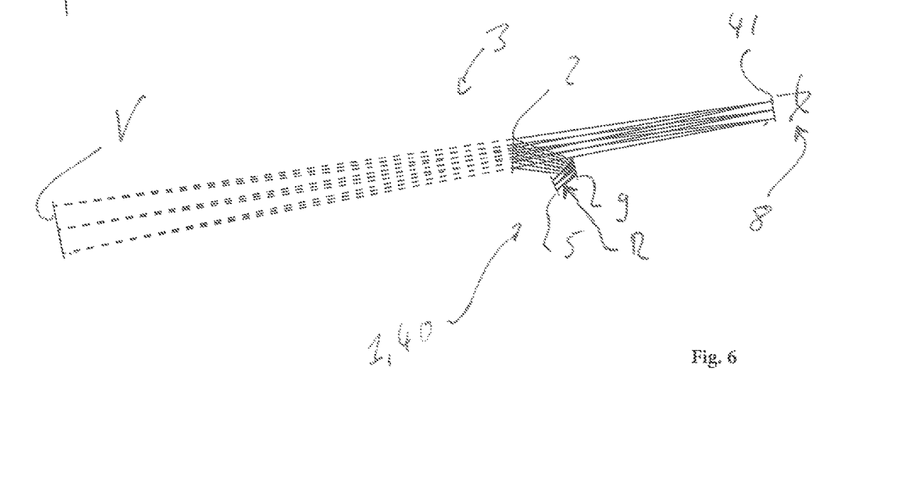

FIGS. 4 to 6 show another exemplary embodiment of the invention, wherein FIGS. 4 and 5 show a first part of the device 1 in a side view and a plan view, and FIG. 6 shows a second part of the device 1 in a side view. Identical reference numerals are used for elements corresponding in their function and/or structure to the elements of the exemplary embodiments of the previous figures. For sake of brevity, only the differences from the exemplary embodiments of FIGS. 1 and 2 are addressed.

FIG. 4 shows a first projection portion 30 of the device 1, wherein the first projection portion 30 extends from the projector 4 to the screen 5. The first projection portion 30 is shown in a side view.

The projector 4 of the exemplary embodiment shown in FIG. 4 is illustrated with an imager 31 and a first projection device 32 arranged along a projection beam path 3 between the imager 31 and the screen 5. The first projection device 32 is constructed, for example, with several lenses that image the image generated by the imager 31 as the real intermediate image R on the screen 5.

An optical axis O of the screen 5 is, as seen in the side view of FIG. 4, tilted from an optical axis O' of the projector 4. An angle W between the optical axis O and the optical axis O' is greater than zero and is preferably 15°; however, angles of up to 30° or a tilt of up to 5° are possible.

The screen 5 is shown in cross-section and has a curvature, in particular a spherical curvature. A center of curvature of the screen 5 is located on the side of the screen 5 on which the projector 4 along the projection path 3 is also arranged. The radius r of curvature is, for example between 100 and 1000 mm and is, for example, 250, 500 or 750 mm.

FIG. 5 shows the first projecting portion 30 of the device 1 in a plan view, wherein in the plan view the optical axes O, O' are, for example, superpositioned.

FIG. 6 shows a second projection portion 40 of the device 1 which extends along the projection beam path 3 from the screen 5 to the display area 2. The second projecting device 9, which projects the intermediate image R of the screen 5 into the display area 2 as the virtual image V, is arranged along the projection beam path 3 after the screen 5 and before the display area 2. In the exemplary embodiment of FIG. 6, the display area 2 is a partially reflective mirror, for example a window and, in particular, the windshield of the motor vehicle, with a reflectivity of less than 20%, for example 10% or 5%. The observer 8 can see the virtual image V when his head is located inside a so-called eyebox.

Typical parameters for the imager are a width of 7 mm and an employed light cone of ±12° (numerical aperture approximately 0.21). However, other imager sizes are also of interest, in particular for applications with a viewing angle of greater than 10°; larger imager with a width of up to 12 mm and a commensurately large number of pixels are of interest for the observer. The intermediate image is typically 70 mm wide, but widths in the range of 40 mm to 120 mm are also common. Typical values for the width of the eyebox are in the range of 120 mm to 200 mm. For the observer, image fields in the range 8 to 16° (±4° to ±8°) are offered at a distance of the virtual image of greater than or equal to 2 m.

Possible optical data of the embodiment of the device 1 shown in FIGS. 4 to 6 are listed in the following Tables 1 to 4:

TABLE 1

| Plan Projection | | | | | |
|---|---|---|---|---|---|
| Radii R0 infinite | Thicknesses and air gaps | Refractive indices ne | Abbe-Number ve | | Screen |
| | t1 | | | 9.43 | Aperture diaphragm |
| R1 = 12.360 | d1 = 3.700 | n1 = 1.81264 | v1 = 22.76 | | |
| R2 = 55.62 | d2 = 2.130 | n2 = 1.69417 | v2 = 27.99 | | |
| R3 = −272.000 | d3 = 0.600 | n3 = 1.51825 | v3 = 59.50 | | |
| R4 = 5.649 | d4 = 3.890 | n4 = 1.62033 | v4 = 58.41 | | |
| R5 = −16.550 | d6 = 3.670 | n5 = 1.76167 | v5 = 24.68 | | |

TABLE 1-continued

Plan Projection

| R6 = 12.860 | d7 = 6.240 | r6 = 1.72407 | v6 = 38.22 |
| R7 = −7.626 | d8 = 4.700 | n7 = 1.80633 | v7 = 26.86 |
| R8 = −−10.770 | d9 = 0.100 | n8 = 1.81077 | v8 = 37.32 |
| R9 = 19.960 | d10 = 3.170 | n9 = 1.48914 | v9 = 65.55 |
| R10 = −9.607 | d11 = 0.550 | | |
| R11 = 71.650 | | | |
| | t2 | | |
| R12 = 19.140 | d13 = 4.860 | | |
| R13 = 193.700 | | | |
| | t3 | | |
| R14 = infinite | d15 = 2.997 | | |
| R15 = infinite | d16 = 0.483 | | |
| R16 = infinite | | | |

Imager

| Transformation | Reference surface | Offset z mm | Offset ¯y' mm | Tilt ° |
|---|---|---|---|---|
| t1 | Screen | 143.370 | −42.07 | −9.2 |
| t2 | 11 | 19.820 | 1.19 | −3.6 |
| t3 | 13 | 0.600 | 0 | 1 |

TABLE 2

HUD-Optics with Flat Screen

| Object | Radii Infinite | Reference | Offset z mm | Offset y mm | Rotation about x (°) | Rotation about y (°) | |
|---|---|---|---|---|---|---|---|
| | | Screen | 106.4474 | 105.954 | −14.076 | | |
| Mirror R1 | 1982.000 | | | | | | Rotationally symmetric spherical |
| | | Screen | −76.75 | 156.339 | 27.067 | 180.0 | |
| Combiner R2 | −1946.080 | | | | | | ** Freeform surface (x.y) polygon |
| | | Screen | 791.028 | −82.326 | −15.378 | | |
| Pupil | Infinite | | | | | | 130 × 64 mm |
| | | Screen | −1619.47 | 580.632 | −13.528 | | |
| Virtual image | Infinite | | | | | | |

Formula: $z = (h^2/R)/1 + \text{SQRT}(1 - 1 + k) * (h/R)^2)) + \text{SUM} cp(i, j) * (x^{**}i) * y^{**}j$ z - Height of arrow at point (x, y)
R Radius
k Conical constant
cp(i, j) Aspheric coefficient for x-power i and y-power j

| Power (i, j) | Value |
|---|---|
| (2, 0) | −4.504E−04 |
| (0, 2) | −4.289E−04 |
| (2, 1) | 3.076E−06 |
| (0, 3) | −3.018E−08 |
| (4, 0) | −3.550E−09 |
| (2, 2} | −6.743E−09 |
| (0, 4) | −3.487E−09 |
| (4, 1) | −2.885E−12 |
| (2, 3) | −5.830E−12 |
| (0, 5) | 1.560E−11 |
| (6, 0) | 4.885E−14 |
| (4, 2) | 1.237E−13 |
| (2, 4) | 1.136E−13 |
| (0, 6) | 1.040E−13 |
| (6, 1) | 1.120E−16 |
| (4, 3) | 1.434E−15 |
| (2, 5) | −9.150E−17 |
| (0, 7) | −1.230E−15 |

TABLE 3

| Curved Projection | | | | |
|---|---|---|---|---|
| Radii | | | | |
| R0 500.000 | Thicknesses and air gaps | Refractive indices ne | Abbe-Number ve | Screen |
| | t1 | | | 9.4 Aperture diaphragm |
| R1 = 12.842 | d1 = 3.391 | n1 = 1.81264 | v1 = 22.76 | |
| R2 = 48.015 | d2 = 2.597 | n2 = 1.69417 | v2 = 27.99 | |
| R3 = −134.020 | d3 = 0.620 | n3 = 1.51825 | v3 = 59.50 | |
| R4 = 5.710 | d4 = 3.825 | n4 = 1.62033 | v4 = 58.41 | |
| R5 = −23.160 | d6 = 2.471 | n5 = 1.76167 | v5 = 24.68 | |
| R6 = 21.615 | d7 = 5.526 | r6 = 1.72407 | v6 = 38.22 | |
| R7 = −7.952 | d8 = 5.634 | n7 = 1.80633 | v7 = 26.86 | |
| R8 = −10.605 | d9 = 0.100 | n8 = 1.81077 | v8 = 37.32 | |
| R9 = 19.818 | d10 = 2.843 | n9 = 1.48914 | v9 = 65.55 | |
| R10 = −11.263 | d11 = 0.550 | | | |
| R11 = 67.768 | | | | |
| | t2 | | | |
| R12 = 19.5.14 | d13 = 5.043 | | | |
| R13 = 233.203 | | | | |
| | t3 | | | |
| R14 = infinite | d15 = 2.997 | | | |
| R15 = infinite | d16 = 0.483 | | | |
| R16 = infinite | | | | |

| Imager | | | | |
|---|---|---|---|---|
| Transformation | Reference surface | Offset z mm | Offset ⁻y' mm | Tilt ° |
| t1 | Screen | 144.060 | −42.1 | −9.571 |
| t2 | 11 | 19.276 | 1.246 | −3.756 |
| t3 | 13 | 0.600 | 0 | 0.962 |

TABLE 4

| HUD-Optics with Curved Screen | | | | | | | |
|---|---|---|---|---|---|---|---|
| | Radii | Reference | Offset z mm | Offset y mm | Rotation about x (°) | Rotation about y (°) | |
| Object | 500.000 | | | | | | |
| | | Screen | 89.167 | 23.295 | 11.037 | | |
| Mirror R1 | 3045.000 | | | | | | * Rotationally symmetric aspherical |
| | | Screen | 83.372 | 158.161 | 26.541 | 180.0 | |
| Combiner R2 | 1946.000 | | | | | | ** Freeform surface (x.y) polygon |
| | | Screen | 791.028 | −82.326 | 15.378 | | |
| Pupil | Infinite | | | | | | 130 × 60 mm |
| | | Screen | 1619.47 | 580.632 | 13.528 | | |
| Virtual image | Infinite | | | | | | |

* Formula: $z = (h^2/R)/1 + \sqrt{1 - 1 + k) \cdot (h/R)^2)} + \sum c(i) \cdot h^{2j}$ i = 2, 3, 4
  z - Height of arrow at radial height h
  R      Radius
  k      Conical constant k = 13.19
  c(i)    Aspheric coefficient with    c(2) = −1.38E−08
                                      c(3) = 1.30E−13
                                      c(4) = −9.71E−17
** Formula: $z = (h^2/R)/1 + \sqrt{1 - 1 + k) \cdot (h/R)^2)} + \sum cp(i, j) \cdot (x^i) \cdot y^j$
  z - Height of arrow at point (x, y)
  R      Radius
  k      Conical constant
  cp(i, j)    Aspheric coefficient for x-power i and y-power j

| Power (i, j) | Value |
|---|---|
| (2, 0) | −4.150E−04 |
| (0, 2) | −3.960E−04 |
| (2, 1) | 3.712E−06 |
| (0, 3) | −6.848E−08 |
| (4, 0) | −3.926E−09 |
| (2, 2} | −7.946E−09 |
| (0, 4) | −1.761E−09 |
| (4, 1) | −6.434E−13 |
| (2, 3) | −1.424E−11 |

TABLE 4-continued

| HUD-Optics with Curved Screen | |
|---|---|
| (0, 5) | 6.734E−11 |
| (6, 0) | 9.009E−14 |
| (4, 2) | 4.290E−13 |
| (2, 4) | 7.713E−13 |
| (0, 6) | −1.159E−12 |
| (6, 1) | 1.688E−16 |
| (4, 3) | 1.385E−15 |
| (2, 5) | 3.053E−15 |
| (0, 7) | −1.572E−14 |
| (8, 0) | −5.227E−19 |
| (6, 2) | −1.444E−17 |
| (4, 4) | −1.212E−17 |
| (2, 6) | −1.712E−16 |
| (0, 8) | 3.065E−16 |

LIST OF REFERENCE SYMBOLS

1 Device
2 Display area
3 Projection beam path
4 Projector (with imager and first projection device)
5 Screen
6, 7 first, second mirror
8 Observer
9 Second projection device
10 Deflection element
20 Entrance pupil of the second projection device
30 First projection section
31 Imager
32 First projection device
40 Second projection section
B Width of the screen, R
D Diameter of the entrance pupil of the second projection device
E, E' Edge region of the screen, R
h Direction different from H, H', H"
H, H', H" Main beam directions
Imax Maximum intensity
O, O' Optical axes
r Radius of the screen
R Real intermediate image
V Virtual image
W Angle between O and O'
Z Central area of the screen, R

What is claimed is:

1. A device for projecting an image into a display area, comprising:
an imager generating a picture;
a first projection device (32) for generating a real intermediate image of the image;
a non-planar screen onto which the first projection device projects the real intermediate image; and
a second projection device, which projects the real intermediate image into the display area, wherein: main beam directions of the non-planar screen are directed to an entrance pupil of the second projection device, wherein, in the main beam directions substantially all sections of the real intermediate image are radiated with a maximum intensity, and wherein, in non-main beam directions of the non-planar screen, the real intermediate image is radiated with less than the maximum intensity.

2. The device according to claim 1, wherein the first projection device is configured to generate the real intermediate image as a curved image.

3. The device according to claim 1, wherein the screen is curved.

4. The device according to claim 3 wherein the real intermediate image is formed commensurate with the geometry of the screen.

5. The device according to claim 3, wherein the second projection device is configured to image a geometry of an object commensurate with the curvature of the screen.

6. The device according to claim 1, wherein the screen is spherically curved.

7. The device according to claim 1, wherein the screen is a reflective screen.

8. The device according to claim 7, wherein the screen is formed as an ellipsoid segment having two focal points, wherein one of the focal points is arranged in an exit pupil of the first projection device and the other of the focal points is arranged in the entrance pupil of the second projection device.

9. The device according to claim 7, wherein the screen is formed as a free-form surface.

10. The device according to claim 1, wherein the screen is arranged with a tilt in relation to an optical axis of the device.

11. The device according to claim 1, wherein the display area is a display area of a head-up display.

* * * * *